United States Patent Office 2,812,326
Patented Nov. 5, 1957

2,812,326

PURIFICATION OF BIS-DEHYDROABIETYL-ETHYLENEDIAMINE-DI-PENICILLINATE

Anthony F. De Rose, Waukegan, Ill., assignor to Abbott Laboratories, North Chicago, Ill., a corporation of Illinois No Drawing. Application March 26, 1956,
Serial No. 573,625

10 Claims. (Cl. 260—239.1)

This invention relates to the preparation of relatively pure compounds containing the dehydroabietylamine group and more particularly to an improved process of preparing relatively pure dehydroabietyl alkylenediamine di-penicillin compounds.

The hydroabietyl alkylenediamines have been found to form sparingly water soluble salts when reacted with a penicillin acid. Of the several hydroabietyl alkylenediamine bases available, the dehydroabietyl alkylenediamines have been found to form salts with a penicillin acid which have unique therapeutic properties and solubility characteristics which distinguish them from the corresponding dihydroabietyl and tetrahydroabietyl alkylenediamine penicillin salts. For example, the N,N'-bis-(dehydroabietyl)-ethylenediamine - di - penicillin G is a stable, non-toxic, sparingly soluble salt which is particularly useful as a means of administering penicillins orally.

A preferred method of preparing the dehydroabietyl alkylenediamines of the present invention comprises treating two moles of dehydroabietylamine dissolved in an inert organic solvent therefor, such as xylene, with one mole of an alkylene dihalide, such as ethylene dibromide, and refluxing the mixture to obtain the corresponding dehydroabietyl alkylenediamine. Another method of preparing the herein disclosed base comprises reacting dehydroabietylamine with a sulfate or sulfonate of an aliphatic composition such as ethylene paratoluenesulfonate, to obtain the corresponding dehydroabietyl ethylenediamine. The insoluble penicillin salts with which the present invention is principally concerned are then prepared from the said alkylenediamine bases by reacting the herein described amine bases or the acid or quaternary ammonium salt thereof with an excess of any desired penicillin acid in a suitable reaction solvent.

The principal source of the dehydroabietylamine group used in the preparation of the above improved penicillin salts is the primary amine dehydroabietylamine which is a unique tricyclic ring system containing two saturated and one unsaturated rings having the following formula:

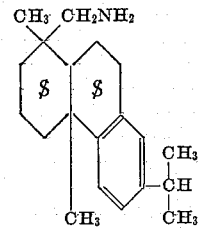

Dehydroabietylamine is sold commercially as "Rosin Amine D" by the Hercules Powder Company and the commercial product is comprised of about 70% dehydroabietylamine and about 30% dihydroabietylamine and tetrahydroabietylamine. Since the several primary amines present in "Rosin Amine D" have very similar physical properties, it is not commercially practicable to isolate pure dehydroabietylamine by commercial distillation procedures. And, while it is possible to obtain pure dehydroabietylamine from commercial "Rosin Amine D," the expense involved therein serves as a deterrent to the commercial utilization of compounds containing dehydroabietylamine groups where it is undesirable or detrimental to have dihydroabietyl and tetra hydroabietyl amine groups present.

It is, therefore, an object of this invention to provide an economical method of preparing penicillin salts containing dehydroabietylamine groups substantially free of dihydroabietylamine and tetrahydroabietylamine groups.

It is also an object of the invention to provide a more economical method of preparing N,N'-bis-(dehydroabietyl)-alkylenediamine - di - penicillin salts uncontaminated with substantial amounts of the N,N'-bis-(dihydroabietyl)-alkylenediamine-di-penicillin and N,N'-bis-(tetrahydroabietyl)-alkylenediamine-di-penicillin salts.

It is a further object of the present invention to provide a direct method of preparing stable N,N'bis-(dehydroabietyl)-alkylenediamine-di-penicillin salts having a high degree of purity from a mixture of amine bases containing the dehydro, dihydro and tetrahydro amine bases.

It is a still further object of the present invention to provide an economical method of separating N,N'-bis-(dehydroabietyl)-alkylenediamine-di-penicillin salt from a mixture containing the corresponding N,N'-bis-(dehydroabietyl)-alkylenediamine-di-penicillin, N,N'-bis - (dihydroabietyl) - alkylenediamine-di-penicillin, and N,N'-bis-(tetrahydroabietyl)-alkylenediamine-di-penicillin.

It is another object of the present invention to provide a process of preparing substantially pure N,N'-bis-(dehydroabietyl)-ethylenediamine from a mixture containing de, di, and tetrahydroabietyl ethylenediamine compounds.

Other objects of the invention will be apparent from the detailed description and claims to follows.

Applicant has discovered that an N,N'-bis-(dehydroabietyl)-alkylenediamine-di-penicillin salt, such as N,N'-bis-(dehydroabietyl)-ethylenediamine - di - penicillin can be obtained from a mixture containing impurities including substantial amounts of the di and tetrahydroabietyl alkylenediamine-di-penicillin salts in a highly pure form by employing a special solvent system. Thus, it has been found that when a mixture including the de, di, and tetrahydroabietyl alkylenediamines produced when commercial "Rosin Amine D" is treated with an alkylene dihalide are reacted with a penicillin acid in an ethyl acetate-chloroform solvent system, a well defined crystalline precipitate forms which is comprised of at least 90% of the N,N'-bis-(dehydroabietyl)-alkylenediamine - di - penicillin salt. The desired selective separation of the said dehydro penicillin salts is preferably obtained by reacting an ethyl acetate solution of penicillin acid with a chloroform solution of the mixtures of dehydro, dihydro, and tetrahydrobietyl alkylenediamine bases. It is also possible to obtain the desired separation by reacting a chloroform solution of a penicillin acid with an ethyl acetate solution of the mixed alkylenediamine bases. In each of the foregoing procedures, there is a substantially quantitative separation of the penicillin salt containing the dehydroabietylamine group from those containing the dihydro and tetrahydroabietylamine groups. It is also within the scope of the present invention to obtain the desired dehydro salts by mixing the penicillin salts of dehydro, dihydro, and tetrahydroabietyl alkylenediamines with a solvent comprising a mixture of ethyl acetate and chloroform whereby the penicillin salt of dehydroabietyl alkylenediamine is precipitated in a highly purified form substantially uncontaminated by the corresponding dihydro and tetrahydroabietyl penicillin salts. If desired, the filtrate which in each instance contains the dihydroabietyl alkylenediamine penicillin salt and the tetrahydroabietyl alkylenediamine penicillin salt can be treated to recover the penicillin and also the dihydroabietyl alkylenediamine and tetrahydroabietyl alkylenediamine groups.

The following specific examples will illustrate the preferred embodiment of the invention, but should not be construed to limit the invention to the precise proportions employed nor the specific procedures, and are shown merely by way of illustrating the inventive concept involved.

EXAMPLE I

*N,N'-bis-(dehydroabietyl)-ethylenediamine*

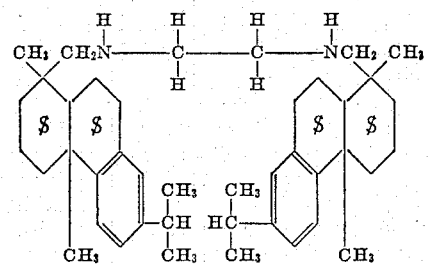

A mixture of 142.5 gms. of "Rosin Amine D" containing about 70% dehydroabietylamine and 30% dihydro and tetrahydroabietylamine, 47.0 gms. of ethylene dibromide, and 60.6 gms. of triethylamine is dissolved in 350 cc. of anhydrous xylene and refluxed for about 16 hours. Thereafter the triethylamine dibromide salt formed is separated from the solution by filtering the cool reaction mixture and washing with ether. The solution is then concentrated under reduced pressure to dryness to remove the ether, xylene and excess triethylamines present. The viscous oil resin is slurried twice with 250 cc. portions of methanol to remove any unreacted primary amines. The oil residue after being washed with methanol is dissolved in ethyl alcohol and 75 cc. of concentrated hydrochloric acid is added dropwise to the warm alcohol solution of the base. The dihydrochloride salts of the several hydroabietyl ethylenediamines precipitates immediately from solution. The salt is then separated by filtering and is washed twice with 100 cc. portions of cooled ethyl alcohol. The dihydrochloride salts of the dehydroabietyl, dihydroabietyl and tetrahydroabietyl ethylenediamine mixture have a melting point of about 292–295° C. On subjecting the mixture to solubility analyses it is found that the dehydroabietyl ethylenediamine is present in substantially the same proportion as is the dehydroabietylamine in the original "Rosin Amine D."

EXAMPLE II

*N,N'-bis-(dehydroabietyl)-ethylenediamine-di-penicillin G*

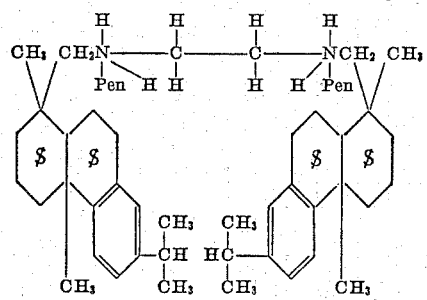

The crude dihydrochlorides of the ethylenediamine bases (1150 g.) as prepared in Example I are extracted with a solution of about 4 liters of chloroform and 4 liters of water which is adjusted to about pH 10 and a second extraction is performed using a solution of about 2 liters of chloroform and the mixture readjusted to about pH 10 with 6 N NaOH if necessary. The chloroform layer containing the mixed free bases is separated from the aqueous layer containing NaCl and is washed with about 1/10 its volume of water to remove any NaCl in the wet chloroform solution. The chloroform solution containing a mixture of the free bases having a volume of about 6 liters is dried with anhydrous $Na_2SO_4$ and then filtered to obtain a clear solution containing about 1 kilogram of the mixed free bases.

Approximately 2300 grams of crude procaine penicillin G is extracted with a solution containing about 4 liters of ethyl acetate and 4 liters of water which has been adjusted to between pH 2 and 3 with 6 N sulfuric acid at a temperature of about 5° C. The procaine penicillin G is thereafter again extracted with about 2 liters of ethyl acetate and the mixture is again adjusted to a pH of 2 to 3 with 6 N sulfuric acid if necessary. The ethyl acetate solution containing penicillin G acid is then washed with about 1/10 its volume of water to remove any trace of sulfuric acid and water soluble procaine sulfate contained in the ethyl acetate solution. The acetate solution having volume of about 6 liters is dried with anhydrous $Na_2SO_4$ and then filtered to obtain a clear solution of approximately 300,000 units penicillin per ml. The aqueous phase containing procaine sulfate can be treated to recover procaine therefrom.

In place of the hydrochlorides of the said bases any other acid salt thereof can be used, including both inorganic and organic acids such as phosphoric, sulfuric, and acetic acids. Also, in place of procaine penicillin any of the other common salts of penicillin can be used as a source of penicillin acid.

The chloroform solution of the free bases prepared in the above manner is then slowly added to the ethyl acetate solution of the penicillin G acid prepared in the above manner. A clear solution forms which rapidly becomes turbid as the bases react with the penicillin acid and crystallization commences. The reaction mixture is allowed to stand overnight in a cool room having a temperature of about 5° C. after thoroughly agitating the mixture. Thereafter the crystalline N,N'-bis-(dehydroabietyl)-ethylenediamine-di-penicillin G is filtered to separate therefrom the cooled mother liquor which contains the unprecipitated N,N'-bis-(dihydroabietyl) - ethylenediamine-di-penicillin salt and N,N'-bis-(tetrahydroabietyl)-ethylenediamine-di-penicillin salt and other impurities. The precipitate is washed thoroughly with about 4 liters of a mixture of chloroform and ethyl acetate (1:1) which is divided into three separate portions. After the final washing the crystals are substantially colorless. The crystalline penicillin salt is thoroughly dried under vacuum at a temperature of about 35° C. The N,N'-bis-(dehydroabietyl)-ethylenediamine-di-penicillin G salt is obtained having purity as determined by solubility analysis in excess of 91% and melts with decomposition at 167–169° C. on a Kofler hot stage. When a 10% chloroform solution of the said N,N'-bis-(dehydroabietyl)-ethylenediamine-di-penicillin G salt, as above produced, is subjected to infra red analysis in a Perkin-Elmer Model 21 double-beam spectophotometer, the following infra red absorption bands are observed:

| Wavelength (microns): | Relative intensity |
|---|---|
| 2.91 | w |
| 3.36 | s |
| 3.46 | m |
| 5.60 | s |
| 5.93 | s |
| 6.2 | w |
| 6.65 | s |
| 6.84 | m |
| 7.16 | m |
| 7.62 | m |
| 8.87 | w |
| 9.17 | w |
| 9.72 | w |
| 9.94 | w |
| 11.22 | w |
| 12.08 | w |
| 14.26 | m |
| 15.10 | m |

The experimental error for absorption lines having medium (m) and strong (s) intensities is ±0.02 micron and the experimental error for lines having weak (w) intensities is ±0.05 micron. The infra red absorption characteristics of the above N,N'-bis-(dehydroabietyl)-ethylenediamine-di-penicillin G is identical within the foregoing experimental error with the infra red absorption band characteristics of a sample of N,N'-bis-(dehydroabietyl)-ethylenediamine-di-penicillin G having a purity in excess of 99%.

The said salt as above produced has a potency as indicated by microbiological assay of about 918 units/mg. compared with the theoretical 939 units/mg. The N,N'-bis-(dehydroabietyl)-ethylenediamine-di-penicillin G salt has a solubility in water at room temperature (25° C.) of 80–100 units/ml. as determined by microbiological assay.

EXAMPLE III

*N,N'-bis-(dehydroabietyl)ethylenediamine-di-penicillin G*

An amyl acetate-penicillin acid solution (10 liters) having a potency of 100,000 u./ml. which is sufficient to supply 565 gms. (2 moles) of penicillin acid is added with constant agitation to 505 gms. of crude N,N'-bis-(dehydroabietyl)-ethylenediamine (as prepared in Example I) dissolved in 500 ml. of amyl acetate. A slight excess of the said ethylenediamine bases is added to the mixture until precipitation is completed. The reaction is preferably carried out in a cold room having a temperature of about 5° C. The precipitation salts comprise about 70% N,N' - bis-(dehydroabietyl)-ethylenediamine-di-penicillin salt and approximately 25–30% of the N,N'-bis-(dihydroabietyl) - ethylenediamine- and N,N' - bis - (tetrahydroabietyl)-ethylenediamine-di-penicillin salts are recovered by filtration and are washed with about 1/10 solution volume of amyl acetate. The crude preparation is further washed with 1/10 solution volume of diethyl ether and dried. The melting point of the product is about 153° C. when taken on a microblock.

The total yield of the crude precipitation obtained in the above manner comprising about 1 kg. is then dissolved in chloroform so as to form a 15% solution of a crude penicillin salt. To the filtered chloroform solution is added ethyl acetate slowly and with agitation until the solution becomes turbid as crystallization begins. Thereafter crystallization is allowed to proceed undisturbed for about 30–60 minutes in a cold room having a temperature of about 5° C. Sufficient ethyl acetate is slowly added to provide a final concentration of about 50% ethyl acetate and the mixture is allowed to stand in the cold room for one hour to complete crystallization. The precipitate is filtered and washed with about 750 ml. of ethyl acetate and thereafter washed with the same volume of ether. The crystals are dried in vacuo and a yield of about 900 gms. of N,N'-bis-(dehydroabietyl)-ethylenediamine-di-penicillin G is obtained. The said penicillin product melts with decomposition at a temperature of 170–172° C. on a Kofler hot stage. Solubility analysis of the product shows the product to be 95.3% pure.

EXAMPLE IV

*N,N'-bis-(dehydroabietyl)-ethylenediamine-di-penicillin G*

Approximately 1 kg. of crude N,N'-bis-(dehydroabietyl)-ethylenediamine dihydrochloride as prepared in Example I and which contains approximately 70% dehydroabietyl ethylenediamine and 30% dihydroabietyl and tetrahydroabietyl ethylenediamine dihydrochloride is dissolved in 45 liters of hot methanol. The methanol solution of the above bases is then added to an aqueous solution comprising 1.08 kg. potassium penicillin in 45 liters of water with vigorous agitation. Crystallization commences immediately and the mixture is stirred for one hour before storing in a cold room having a temperature of about 5° C. The precipitate comprising a mixture of the penicillin salts of the several bases is then filtered and washed with water and diethyl ether and dried in vacuo overnight at 40° C.

The crude penicillin salt is then subjected to recrystallization by dissolving in 13.3 liters of chloroform. To the clear filtered chloroform solution is slowly added without agitation an equal volume (13.3 liters) of ethyl acetate. Crystallization commences immediately and is allowed to continue undisturbed at a room temperature for about 5–6 hours. Thereafter the solution is agitated thoroughly before storing in a cold room (5° C.) overnight to allow complete crystallization. The precipitate is filtered and washed with cold diethyl ether and dried in vacuo at 40° C. The product which comprises 91% N,N'-bis-(dehydroabietyl) - ethylenediamine - di - penicillin G salt melts with decomposition at 165–167° C. on a Kofler hot stage. The said penicillin salt has a potency of 907 u./mg. when subjected to bio-assay, as compared with a theoretical potency of 939 u./mg.

EXAMPLE V

*N,N'-bis-(dehydroabietyl)-ethylenediamine-di-pencillin G*

The crude ethylenediamine base dihydrochloride as prepared in Example I (2 kg.) is dissolved in 90 liters of warm methyl alcohol and added to 90 liters of water containing 2 kilograms of potassium penicillin. An immediate precipitation of a crystalline product is obtained. Constant vigorous agitation is maintained for approximately 2 hours and thereafter the solution is centrifuged. The filter cake formed is washed thoroughly with water and dried in a vacuum oven at 40° C. for approximately two days. The salt which still contains an appreciable quantity of water is dissolved in chloroform and approximately 1800 ml. water is removed by phase separation.

The chloroform solution thus freed of water and having a volume of approximately 25 liters is combined with 25 liters of ethyl acetate and interfacial crystallization is allowed to proced for about five hours. The mixture is stirred and thereafter stored over night. The filtered product is washed with 4 liters of ether and dried in vacuum at 40° C. The dry product is recrystallized by forming about a 15% solution (w./v.) in chloroform and adding an equal volume of ethyl acetate to the chloroform solution to initiate crystallization. The recovered recrystallized product comprises substantially pure N,N'-bis-(dehydroabietyl)-ethylenediamine-di-penicillin G and has a potency of 914 u./mg as determined by conventional microbiological assay methods.

EXAMPLE VI

*N,N'-bis-(dehydroabietyl)-ethylenediamine-di-pencillin G*

An ethyl acetate solution of penicillin acid (7 gms. in 25 cc. solution) is added to 25 cc. of chloroform containing 6.5 gms. of a crude mixture of ethylenediamine base as prepared in Example I. A dense granular crystalline precipitate is obtained immediately. The product is collected by filtration, washed and dried to produce a 72% yield of the compound N,N'-bis-(dehydrobietyl)-ethylenediamine-di-penicillin G which, on being subjected to a solubility analysis, is found to comprise in excess of 92% of the pure penicillin salt.

EXAMPLE VII

*N,N'-bis-(dehydroabietyl)-ethylenediamine*

The compound N,N'-bis-(dehydroabietyl)-ethylenediamine-di-penicillin G prepared in accordance with any of the preceding examples is treated in a chloroform-water solution with sufficient sodium carbonate to raise the pH of the mixture to pH 9–10. The freed penicillin is extracted into the aqueous phase as the sodium penicillin salt and the compound N,N'-bis-(dehydroabietyl)-ethylenediamine is extracted into the chloroform phase. The said dehydroabietyl ethylenediamine is recovered by drying the chloroform solution until free of chloroform and thereafter treating the dry free base with methanolhydrochloric acid solution to convert the base to the dihydrochloride. The dihydrochloride salt of N,N'-bis-(dehydroabietyl)-ethylenediamine is filtered and dried. The dry dihydrochloride salt of N,N'-bis-(dehydroabietyl)-ethylenediamine has a melting point of 287–288° C. and there is no depression of melting point when the said dihydrochloride salt is mixed with a known sample of the pure material. Also, its ultraviolet absorbency is identical with that of the known sample of the pure material.

It will be apparent that the procedure of the foregoing example makes it possible to obtain substantially pure N,N'-bis-(dehydroabietyl)-ethylenediamine uncontaminated by appreciable quantities of the dihydroabietyl ethylenediamine and tetrahydroabietyl ethylenediamine in a simple and economical manner by the removal of the penicillin molecule from the dehydrobietyl ethylenediamine penicillin salt prepared in accordance with the present invention.

EXAMPLE VIII

N,N'-bis-(dehydroabietyl)-ethylenediamine-di-penicillin V

The crude dihydrochlorides of the ethylenediamine bases (985 g.) as prepared in Example I are extracted with a solution of about 3 liters of chloroform and 3 liters of water which is adjusted to about pH 10 and a second extraction is performed using a solution of about 2 liters of chloroform and the mixture readjusted to about pH 10 with 6N NaOH if necessary. The chloroform layer containing the mixed free bases is separated from the aqueous layer containing NaCl and is washed with about 1/10 its volume of water to remove any NaCl in the wet chloroform solution. The chloroform solution containing a mixture of the free bases having a volume of about 5 liters is dried with anhydrous $Na_2SO_4$ and then filtered to obtain a clear solution containing about 0.85 kilogram of the mixed free bases.

Approximately 1000 grams of phenoxymethyl penicillin acid ("Penicillin V") is dissolved directly in about 5 liters of ethyl acetate to a concentration of 20% w./v. The resulting solution is filtered to remove any insoluble salts. The penicillin V acid (1000 g.) may also be obtained by extracting an aqueous solution of 1110 grams of the potassium salt of phenoxymethyl penicillin at a temperature of about 5° C., said solution being adjusted to pH 2–3 by the addition of 6 N sulfuric acid, twice with a total of five liters of ethyl acetate so that the final washed combined volume will have a concentration of about 20% w./v. The said ethyl acetate solution having a volume of about 5 liters is then dried with anhydrous $Na_2SO_4$ and filtered to obtain a clear ethyl acetate solution of phenoxymethyl penicillin acid.

In place of the hydrochlorides of the said bases any other acid salt thereof can be used, including both inorganic and organic acids such as phosphoric, sulfuric, and acetic acids. Also, in place of the mentioned penicillin, any of the other common salts of penicillin can be used as a source of penicillin acid.

The chloroform solution of the free bases prepared in the above manner is then slowly added to the ethyl acetate solution of the penicillin V acid prepared in the above manner. A clear solution forms which rapidly becomes turbid as the bases react with the penicillin acid and crystallization commences. The reaction mixture is allowed to stand overnight in a cool room having a temperature of about 5° C. after thoroughly agitating the mixture. Thereafter, the crystalline N,N'-bis-(dehydroabietyl)-ethylenediamine-di-penicillin V is filtered to separate therefrom the cooled mother liquor which contains the unprecipitated N,N'-bis-(dihydroabietyl)-ethylenediamine-di-penicillin salt and N,N'-bis-(tetrahydroabietyl)-ethylenediamine-di-penicillin salt and other impurities. The precipitate is washed thoroughly with about 4 liters of a mixture of chloroform and ethyl acetate (1:1) which is divided into three separate portions. After the final washing, the crystals are substantially colorless. The crystalline penicillin salt is thoroughly dried under vacuum at a temperature of about 50° C. The N,N'-bis-(dehydroabietyl)-ethylenediamine-di-penicillin V salt is obtained having purity as determined by solubility analysis in excess of about 90% and melts with decomposition at 163–165° C. on a Kofler hot stage.

EXAMPLE IX

N,N'-bis-(dehydroabietyl)-ethylenediamine-di-penicillin S

The crude dihydrochlorides of the ethylenediamine bases (1150 g.) as prepared in Example I are extracted with a solution of about 4 liters of chloroform and 4 liters of water which is adjusted to about pH 10 and a second extraction is performed using a solution of about 2 liters of chloroform and the mixture readjusted to about pH 10 with 6 N NaOH if necessary. The chloroform layer containing the mixed free bases is separated from the aqueous layer containing NaCl and is washed with about 1/10 its volume of water to remove any NaCl in the wet chloroform solution. The chloroform solution containing a mixture of the free bases having a volume of about 6 liters is dried with anhydrous $Na_2SO_4$ and then filtered to obtain a clear solution containing about 1 kilogram of the mixed free bases.

Approximately 1.4 kg. of potassium salt of phenylmercaptomethyl penicillin ("Penicillin S") is extracted with a solution containing 4 liters of ethyl acetate and 4 liters of water which has been adjusted to between pH 2 and 3 with 6 N sulfuric acid at a temperature of about 5° C. The potassium penicillin salt is thereafter again extracted with about 2 liters of ethyl acetate, the mixture again being adjusted to a pH of 2 to 3 with 6 N sulfuric acid, if necessary. The ethyl acetate solution containing penicillin S acid is then washed with about 1/10 its volume of water to remove any trace of sulfuric acid and water soluble potassium sulfate contained in the ethyl acetate solution. The said ethyl acetate solution having a volume of about 6 liters is then dried with anhydrous $Na_2SO_4$ and filtered to obtain a clear solution of phenylmercaptomethyl penicillin acid.

In place of the hydrochlorides of the said bases, any other acid salt thereof can be used, including both inorganic and organic acids such as phosphoric, sulfuric, and acetic acids. Also, in place of the mentioned penicillin, any of the other common salts of penicillin can be used as a source of penicillin acid.

The chloroform solution of the free bases prepared in the above manner is then slowly added to the ethyl acetate solution of the penicillin S acid prepared in the above manner. A clear solution forms which rapidly becomes turbid as the bases react with the penicillin acid and crystallization commences. The reaction mixture is allowed to stand overnight in a cool room having a temperature of about 5° C. after thoroughly agitating the mixture. Thereafter, the crystalline N,N'-bis-(dehydroabietyl)-ethylenediamine-di-penicillin S is filtered to separate therefrom the cooled mother liquid which contains the unprecipitated N,N'-bis-(dihydroabietyl)-ethylenediamine-di-penicillin salt and N,N'-bis-(tetrahydroabietyl)-ethylenediamine-di-penicillin salt and other impurities. The precipitate is washed thoroughly with about 4 liters of a mixture of chloroform and ethyl acetate (1:1) which is divided into three separate portions. After the final washing, the crystals are substantially colorless. The crystalline penicillin salt is thoroughly dried under vacuum at a temperature of about 50° C. The N,N'-bis-(dehydroabietyl)-ethylenediamine-di-penicillin S salt is obtained having purity as determined by solubility analysis in excess of above 90% and melts with decomposition. On chemical analysis for sulfur the said salt was found to contain 8.8% sulfur, as compared with a theoretical content of 9.5% sulfur.

In the foregoing Examples II through IX, the said dehydroabietyl penicillin salt precipitates in a well-defined crystalline form which is readily filtered from the solvent medium and which can be easily washed free of occluded solvents and impurities. Thus, the solvent system of the present invention, in addition to providing for substantially complete separation of the said dehydroabietyl salt from the said dihydroabietyl and tetrahydroabietyl salts, also enables the production of well-defined crystalline N,N'-bis-(dehydroabietyl)-alkylenediamine-di-penicillin salts which are readily handled and purified.

It should also be understood that in the present invention wide variations in the proportions of the respective components of the solvent mixture are possible. Thus, while approximately equal proportions of the respective chloroform and ethyl acetate components are preferred because optimum yields of pure dehydroabietyl penicillin salt are obtained therewith, the desired qualitative separation of the several dehydroabietyl alkylenediamine salts is obtained when the solvent mixture comprises less than 50% ethyl acetate. When more than about 50% ethyl acetate is used in the said solvent mixture, there is no detectable increase in the yield of the desired pure penicillin salt nor is there any decrease in the purity of the desired penicillin salt. The volume of chloroform used is, of course, that sufficient to solubilize the quantity of dehydro, dihydro, and tetrahydroabietyl alkylenediamine-di-penicillin salt present at any time in the solvent system.

The N,N'-bis-(dehydroabietyl)-ethylenediamine-di-penicillin salts can be most readily identified for analytical or control purposes by means of X-ray diffraction and infra red absorption maxima characteristics. The data shown in the following Table A were obtained by subjecting a crystal of N,N'-bis-(dehydroabietyl)-ethylenediamine-di-penicillin G having purity of at least about 99% to conventional X-ray examination in a General Electric powder camera having 143.2 mm. diameter with a nickel-filtered copper radiation ($\lambda=1.5418$ A). The camera geometry permitted detection of spacing up to 20 A. The said crystal was rhombohedral and belonged to the uniaxial, positive system. Values of $\omega=1.560$ and $\epsilon>1.6$ were noted for the said crystal.

TABLE A.—X-RAY DIFFRACTION

| d. spacing: | Estimated relative intensity |
|---|---|
| 17.1 A | 10 |
| 8.07 | 5 |
| 7.41 | 5 |
| 5.91 | 6 |
| 5.20 | 9 |
| 4.37 | 6 broad |

While additional d. spacing of less relative intensity are observed, the above spacing data clearly identify and distinguish the compound N,N'-bis-(dehydroabietyl)-ethylenediamine-di-penicillin G from all other penicillin salts including the N,N'-bis-(dihydroabietyl)-ethylenediamine-di-penicillin G and N,N'-bis-(tetrahydroabietyl)-ethylenediamine-di-penicillin G.

The infra red absorption data shown in the following Table B were obtained by preparing a 10% chloroform solution of N,N'-bis-(dehydroabietyl)-ethylenediamine-di-penicillin G having a purity of at least about 99% and subjecting the said solution to infra red analysis in a Perkin-Elmer Model 21 double-beam spectophotometer.

TABLE B.—INFRA RED ABSORPTION MAXIMA

| Wavelength (microns): | Relative intensity |
|---|---|
| 2.93 | w |
| 3.38 | s |
| 3.46 | m |
| 5.61 | s |

TABLE B.—INFRA RED ABSORPTION MAXIMA—Con.

| Wavelength (microns): | Relative intensity |
|---|---|
| 5.94 | s |
| 6.20 | w |
| 6.64 | s |
| 6.85 | m |
| 7.15 | m |
| 7.62 | m |
| 8.87 | w |
| 9.17 | w |
| 9.76 | w |
| 9.93 | w |
| 11.22 | w |
| 12.08 | w |
| 14.27 | m |
| 15.10 | m |

In the foregoing Table B, the experimental error for absorption lines having medium (m) and strong (s) intensities is ±0.02 micron and the experimental error for lines having weak (w) intensities is ±0.05 micron.

While the present invention has been illustrated with insoluble salts of penicillin G, penicillin V, and penicillin S, it should be understood that other penicillins, both natural and biosynthetic, can be employed with equal facility to produce insoluble penicillin salts of N,N'-bis-(dehydroabietyl)-ethylenediamine and equivalent N,N'-bis-(dehydroabietyl)-lower alkylenediamines. Thus stable insoluble salts of penicillin O, penicillin F, penicillin X, penicillin K and other natural and biosynthetic penicillins are within the scope of the present invention.

And, whereas the preferred embodiment of the present invention employs the ethylene radical in preparing the N,N'-bis-(dehydroabietyl)-alkylenediamine or N-dehydroabietyl-alkylenediamine, it should be understood that other alkylene groups having between two and eight carbon atoms per molecule can be employed in the present invention.

It will be apparent from the foregoing description that the present invention provides, in addition to other advancements, a very economical and expedient method of preparing the insoluble salts of penicillin containing dehydroabietylamine groups substantially free of dihydroabietyl and tetrahydroabietylamine groups normally present in the available commercial sources of dehydroabietylamine and eliminates the necessity of separating dehydroabietylamine from dihydroabietylamine and tetrahydroabietylamine. It is thus made economically feasible to utilize for pharmaceutical preparations and other non-pharmaceutical uses the insoluble penicillin salts containing dehydroabietylamine groups essentially uncontaminated with dihydroabietyl and tetrahydroabietyl ethylenediamine groups.

This application is a continuation-in-part application of the applicant's co-pending application Serial No. 381,478, filed September 21, 1953, now abandoned.

Others may readily adapt the invention for use under various conditions of service, by employing one or more of the novel features disclosed or equivalents thereof. As at present advised with respect to the apparent scope of my invention, I desire to claim the following subject matter.

I claim:

1. A process of preparing a substantially pure dehydroabietyl group-containing salt which comprises; subjecting the mixture containing a major proportion of a penicillin salt of an N,N'-bis-(dehydroabietyl)-lower alkylenediamine and a minor proportion of a penicillin salt of at least one member selected from the group consisting of an N,N'-bis-(dihydroabietyl)-lower alkylenediamine and an N,N'-bis-(tetrahydroabietyl)-lower alkylenediamine to intimate contact with mixed liquid solvents comprising essentially chloroform and ethyl acetate with at least about one volume of chloroform for every volume of ethyl acetate, allowing the said penicillin salts to remain in contact with the said solvents until precipitation of the said penicillin salt of the N,N'-bis-(dehydroabietyl)-lower alkylenediamine is substantially complete, and recovering the substantially pure penicillin salt of N,N'-bis-(dehydroabietyl)-alkylenediamine which forms as a crystalline precipitate.

2. A process as in claim 1 wherein the pencillin group is pencillin G.

3. A process as in claim 1 wherein the penicillin group is penicillin V.

4. A process as in claim 1 wherein the penicillin group is penicillin S.

5. A process of preparing substantially pure N,N'-bis-(dehydroabietyl)-ethylenediamine-di-penicillin which comprises; subjecting a mixture containing a major proportion of a penicillin salt of an N,N'-bis(dehydroabietyl)-ethylenediamine and a minor proportion of a penicillin salt of N,N'-bis-(dihydroabietyl)-ethylenediamine and a penicillin salt of N,N'-bis-(tetrahydroabietyl)-ethylenediamine to intimate contact with a liquid solvent comprising essentially chloroform and ethyl acetate with at least about one volume of chloroform for every volume of ethyl acetate, allowing the said penicillin salts to remain in contact with the said solvents until precipitation of the penicillin salt of the N,N'-(dehydroabietyl)-ethylenediamine is substantially complete, and recovering the substantially pure N,N'-bis-(dehydroabietyl)-ethylenediamine-di-penicillin which forms as a crystalline precipitate.

6. In a process of preparing a compound containing a dehydroabietyl group substantially free of compounds containing a dihydroabietyl group and a tetrahydroabietyl group, the steps comprise: mixing a chloroform solution of a mixture of a major proportion of the free bases comprising an N,N'-bis-(dehydroabietyl)-lower alkylenediamine and a minor proportion of at least one member of the group consisting of an N,N'-bis-(dihydroabietyl)-lower alkylenediamine and an N,N'-bis-(tetrahydroabietyl)-lower alkylenediamine with an ethyl acetate solution of a penicillin acid, whereupon the penicillin salts of the said free bases are formed; allowing the said penicillin salts to remain in contact with the liquid chloroform and ethyl acetate solution until precipitation of the penicillin salt of N,N'-bis-(dehydroabietyl)-lower alkylenediamine is substantially complete; and recovering the penicillin salt of the said dehydroabietyl-lower alkylenediamine which forms as a crystalline precipitate substantially free of penicillin salts of the said dihydroabietyl and tetrahydroabietyl lower alkylenediamines.

7. In a process of preparing the compound N,N'-bis-(dehydroabietyl)-ethylenediamine-di-penicillin substantially free of the penicillin salt of N,N'-bis-(dihydroabietyl)-ethylenediamine and the penicillin salt of N,N'-bis-(tetrahydroabietyl)-ethylenediamine, the steps comprise: mixing a chloroform solution of a mixture of a major proportion of the free bases comprising N,N'-bis-(dehydroabietyl)-ethylenediamine and a minor proportion of N,N'-bis-(dihydroabietyl)-ethylenediamine and N,N'-bis-(tetrahydroabietyl)-ethylenediamine with an ethyl acetate solution of a penicillin acid, whereupon the penicillin salts of the said free bases are formed; allowing the said penicillin salts to remain in contact with a solution of chloroform and ethyl acetate with at least about one volume of chloroform for every volume of ethyl acetate until precipitation of the penicillin salt of N,N'-bis-(dehydroabietyl)-ethylenediamine is substantially complete, and recovering the N,N'-bis-(dehydroabietyl)-ethylenediamine-di-penicillin which forms as a crystalline precipitate substantially free of the penicillin salts of N,N'-bis-(dihydroabietyl)-ethylenediamine and N,N'-bis-(tetrahydroabietyl)-ethylenediamine.

8. The process substantially as described in claim 7 wherein substantially equal volumes of chloroform and ethyl acetate are used.

9. In a process of preparing a compound containing a dehydroabietyl group substantially free of compounds containing a dihydroabietyl group and a tetrahydroabietyl group, the steps comprise: mixing an ethyl acetate solution of a mixture of a major proportion of the free bases comprising an N,N'-bis-(dehydroabietyl)-lower alkylenediamine and a minor proportion of an N,N'-bis-(dihydroabietyl)-lower alkylenediamine and an N,N'-bis-(tetrahydroabietyl)-lower alkylenediamine with a chloroform solution of a penicillin acid, whereupon the penicillin salts of the free bases are formed; allowing the said pencillin salts to remain quiescent in contact with a solution of ethyl acetate and chloroform with at least one volume of chloroform for every volume of ethyl acetate until precipitation of the penicillin salt of N,N'-bis-(dehydroabietyl)-lower alkylenediamine is substantially complete; and recovering the penicillin salt of the dehydroabietyl alkylenediamine which forms as a crystalline precipitate substantially free of penicillin salts of the dihydroabietyl and tetrahydroabietyl alkylenediamines.

10. In a process of preparing the compound N,N'-bis-(dehydroabietyl)-ethylenediamine-di-penicillin substantially free of the penicillin salt of N,N'-bis-(dihydroabietyl)-ethylenediamine and the penicillin salt of N,N'-bis-(tetrahydroabietyl)-ethylenediamine, the steps comprise: mixing an ethyl acetate solution of a mixture of a major proportion of the free bases comprising N,N'-bis-(dehydroabietyl)-ethylenediamine and a minor proportion of N,N'-bis-(dihydroabietyl)-ethylenediamine and N,N'-bis-(tetrahydroabietyl)-ethylenediamine with a chloroform solution of a penicillin acid, whereupon the penicillin salts of the said free bases are formed; allowing the said penicillin salts to remain quiescent in contact with a solution of ethyl acetate and chloroform with at least about one volume of chloroform for every volume of ethyl acetate until precipitation of the penicillin salt of N,N'-bis-(dehydroabietyl)-ethylenediamine is substantially complete; and recovering the N,N'-bis-(dehydroabietyl)-ethylenediamine-di-penicillin which forms as a crystalline precipitate substantially free of the penicillin salts of N,N'-bis-(dihydroabietyl)-ethylenediamine and N,N'-bis-(tetrahydroabietyl)-ethylenediamine.

References Cited in the file of this patent

UNITED STATES PATENTS

| | | |
|---|---|---|
| 2,577,865 | Tishler | Dec. 11, 1951 |
| 2,578,641 | Cooper | Dec. 11, 1951 |
| 2,585,436 | Cheney | Feb. 12, 1952 |
| 2,627,491 | Szabo et al. | Feb. 3, 1953 |